United States Patent [19]

Horsch

[11] Patent Number: 4,651,858
[45] Date of Patent: Mar. 24, 1987

[54] CLUTCH DISENGAGEMENT CONTROL SYSTEM

[75] Inventor: Joachim Horsch, Lombard, Ill.

[73] Assignee: J. I. Case Company, Racine, Wis.

[21] Appl. No.: 690,569

[22] Filed: Jan. 11, 1985

[51] Int. Cl.⁴ .............................................. F16D 25/11
[52] U.S. Cl. ............................... 192/87.13; 192/87.18; 192/3.58
[58] Field of Search ................. 192/87.1, 87.13, 87.14, 192/87.18, 87.19, 3.58

[56] References Cited

U.S. PATENT DOCUMENTS

| | | | |
|---|---|---|---|
| 3,468,194 | 9/1969 | Horsh et al. .................. | 192/87.13 X |
| 3,780,762 | 12/1973 | Matthews et al. ............ | 192/87.19 X |
| 3,863,523 | 2/1975 | Starling et al. ............... | 74/754 |
| 4,111,071 | 9/1978 | Pearce et al. ................. | 192/87.13 X |
| 4,396,099 | 8/1983 | Shirley ........................... | 192/3.57 |

Primary Examiner—Rodney H. Bonck
Assistant Examiner—Richard M. Lorence
Attorney, Agent, or Firm—Cullen, Sloman, Cantor, Grauer, Scott & Rutherford

[57] ABSTRACT

A shut off control system for the fluid activated clutches of a transmission is provided. The inventive control valve automatically shuts off hydraulic flow to the clutches whenever the engine of the vehicle is turned off. When the vehicle is restarted the clutch pedal must be depressed and released before fluid can again activate the clutches. With the inventive control system, the vehicle can be started in any gear but the vehicle will not move until the clutch pedal is depressed and released by the vehicle operator.

1 Claim, 2 Drawing Figures

CLUTCH DISENGAGEMENT CONTROL SYSTEM

BACKGROUND OF THE INVENTION

The present invention relates to a control system for a clutch and more particularly to a disengagement valve for the control system of fluid activated clutches in a vehicle transmission.

DISCLOSURE STATEMENT

Various power cut-off devices have been utilized in vehicles to prevent movement in the vehicle upon initial start of the vehicle engine. Examples of the above-noted systems can be found in U.S. Pat. No. 4,396,099 Shirley, U.S. Pat. No. 3,863,523, Starling et al. and U.S. Pat. No. 3,468,194, Horsch.

The present invention is brought forth in an attempt to provide a shut-off valve for the clutches in a fluid activated transmission which is more simple in construction and function than the shut-off systems provided by the aforementioned patents.

SUMMARY OF THE INVENTION

The present invention provides a control valve for a transmission having fluid activated clutch or clutches wherein the valve is biased to a first position preventing fluid communications to the fluid activated clutch. By manually depressing and releasing the clutch pedal, the valve is moved to a second position which allows selective fluid communication between the fluid inlet of the valve and the fluid activated clutch or clutches. By use of the inventive control valve, the vehicle may be started in any gear, however, before the vehicle can move, the vehicle operator must depress and release the clutch pedal.

It is an object of the present invention to provide a control system for a transmission having a fluid operated clutch which allows the vehicle in which the transmission is placed, to be started up in any gear and at the same time preventing activation of any of the clutch elements until the vehicle operator depresses the clutch and releases the same.

Other object of the present invention will become more apparent to those skilled in the art as the nature of the invention is better understood from the accompanying drawings and a detailed description.

DETAILED DESCRIPTION OF THE DRAWINGS

HIGH LOW POWERSHIFT CONTROL

Figure 1:
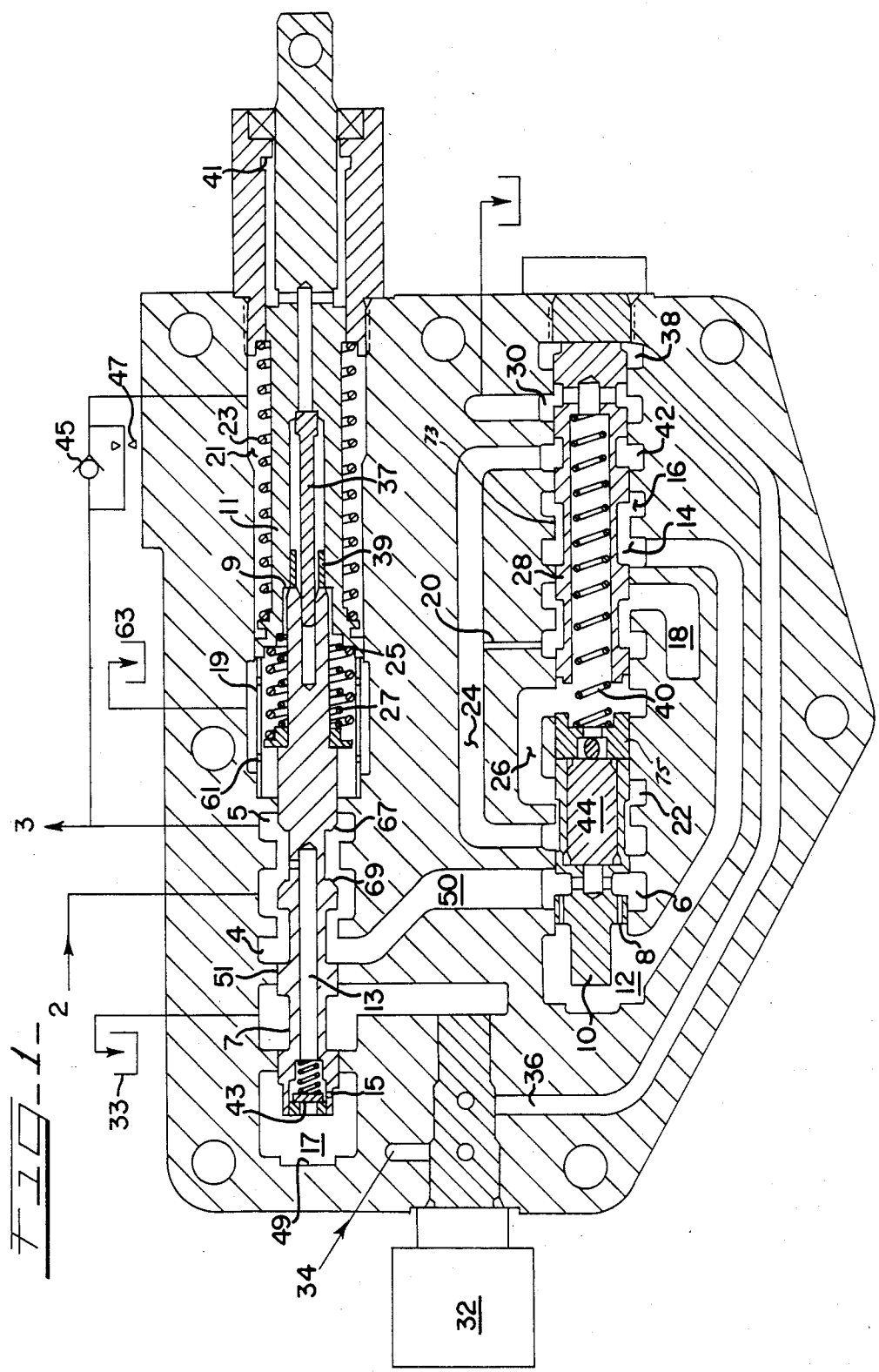
FIG. 1 is a top sectional view of the control system of the present invention.

In the position shown, pressurized fluid (hydraulic oil) is directed from source 2 in through port 4, through port 6 (via port 50), through orifice 8 in spool (or drainage valve) 10, through port 12, through port 14 to the High clutch piston (not shown) connected by port 16. The Low clutch piston (not shown) connected to passage 18 is drained through passages 20 and 24, through port 22, through passage 26, through the holes in spool 28, to drain port 30. When a shift is made by actuating the solenoid 32, pressure fluid is directed from port 34 through passage 36 (36 was connected to drain by solenoid 32 prior to shift) to port 38, forcing the spool 28 (which is slideably mounted within the bore 73) toward the left against the force of spring 40. Spring 40 at its left end is held by divider 75 which divides bore 73 into separate but communicating chambers. The movement of (selector) spool 28 will connect the Low clutch passage port 18 to port 14 and the High clutch port to drainage port 42. As oil flows from 2 through orifice 8 a pressure drop occurs in port 12 causing spool 10 to shift leftward due to the force caused by reaction pin 44. Now drainage port 42 is cut off from drain and connected to source 2, (via passage 50) thus the High clutch port 16 is still pressurized while the Low clutch port 18 is being filled. As soon as the flow to the Low clutch stops, the pressure rises in port 12, shifting the spool 10 rightward, connecting the High clutch to drain and of course simultaneously the Low clutch is now pressurized.

Shifting from Low to High the solenoid 32 connects the port 36 to drain causing the spool 28 to move rightward and triggering the same sequence of events described above.

MASTER CLUTCH CONTROL

In the position shown the master clutch 3 is pressurized from 2 to port 5. The spool 7 is held against surface 9 of spool 11 by pressure directed through internal passage 13 in spool 7 through damping orifice 15 in spool 7 to chamber 17. The spool 11 is held against the stop 19 by pressure in the annular spring cavity 21, in addition the force of spring 23.

As spool 11 is pulled rightward by actuating the clutch pedal, the spool 7 will follow the rightward motion until the metering slots 69 and 67 are positioned between 2 on one side and drain 63 on the other side causing the pressure in port 5 to drop until a force equilibrium is established betweeen the pressure force in port 17 and the force of springs 25 and 27. (Stop 19 has holes 61 to allow the chambers surrounding springs 27 and 25 to communicate with drain 63). At this point of motion the contact at surface 9 is eliminated. Further rightward motion of spool 11 will decrease the force of spring 25 and 27 reducing the clutch pressure further. At approximately mid-point of the rightward movement the spring 27 reaches its free length and the force of 25 only is acting on spool 11. Further motion of spool 11 will continue to decrease the clutch pressure but at a lower rate. Spool members 7 and 11 have a lost motion type connection. Eventually the headed pin 37 (pressed into spool 7) will contact the bushing 39, and further rightward movement of spool 11 will also pull spool 7 rightward. This will drop the pressure to the master clutch to zero and also will cut off pressure from port 4 and connect it (4) to drain 33. Thus, the pressure to the powershift (sometimes referred to auxiliary) clutches High or Low is dropped to zero. The spool 11 will finally contact the surface 41 at the extreme right position.

When the clutch pedal is released the spool 11 will move leftward urged by the force of spring 23. If the leftward movement is sudden, the check valve 43 opens allowing oil to flow out of cavity 17 at a high rate rather than being restricted by orifice 15. (This orifice 15 is required for damping purposes in the metering position.) Thus, spool 11 can move rapidly to the metering position allowing for a good response.

When the clutch pedal is actuated rapidly pulling spool 11 rapidly rightward, oil is displaced from cavity 21 through check valve 45 at a rapid rate. Thus, the clutch can be disengaged rapidly. When the clutch pedal is released rapidly oil flow is restricted through orifice 47 into cavity 21. Thus, the clutch pedal will return at a slow rate providing for a gradual engagement of the clutch. The combination of check valve 45 and fluid resistor 47 mounted in parallel provides unidirectional fluid resistance in the line connecting the clutch outlet and the first chamber (spring chamber 21).

When the tractor is shut down the fluid pressure from source 2 is zero. That allows the spool 7 to move leftward against surface 49 urged by springs 25 and 27. On start up the pressure cannot build up in chamber 17 since it is connected to drain 33 in this position. Thus, pressure cannot get to any of the clutches. The clutch pedal will have to be depressed to mechanically pull the spool 7 rightward to disconnect port 17 from drain. Then after the pedal is released pressure can build up in port 17 and thus in the clutches. Therefore the engine can be started in any gear, but the tractor will not move until the clutch pedal is depressed and released.

Figure 2:
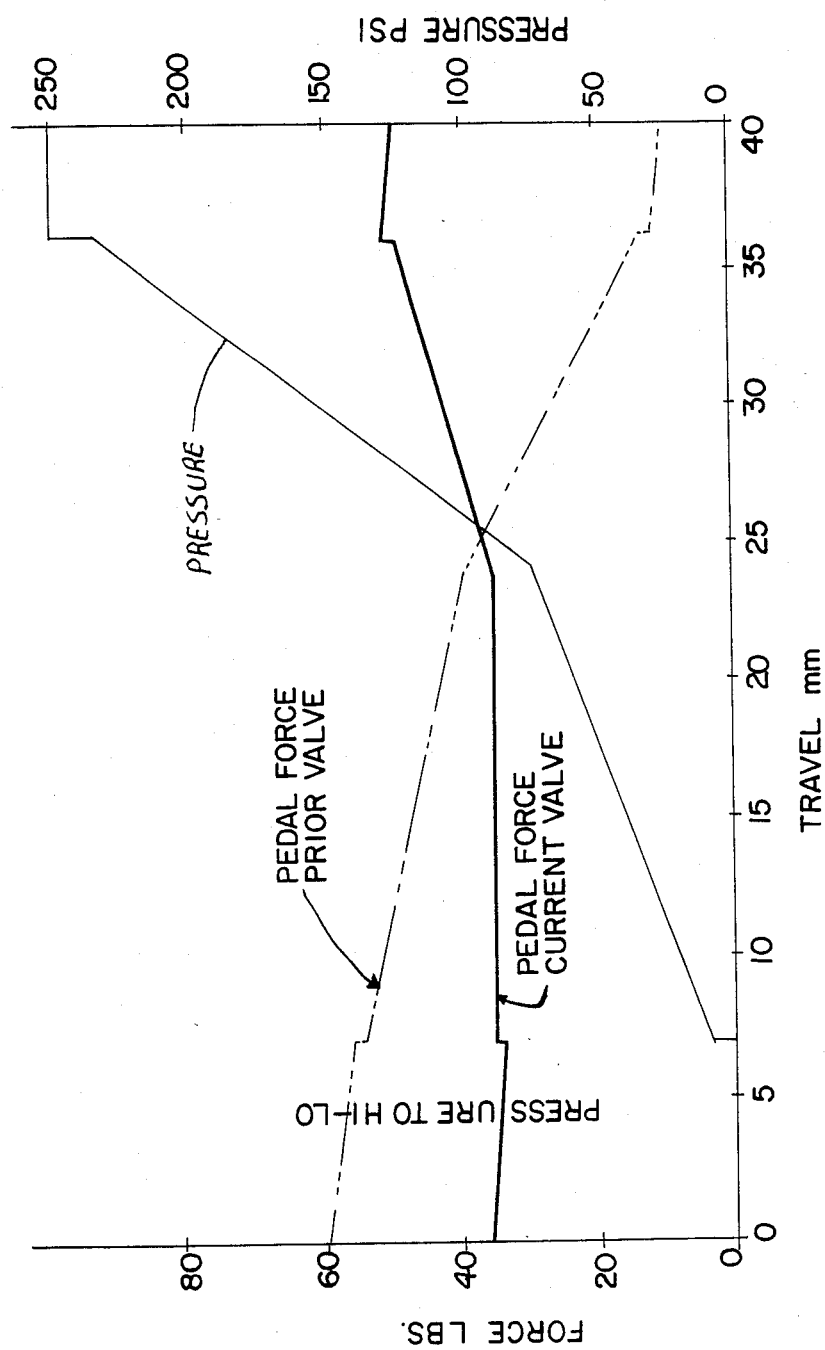
FIG. 2 is a graph illustrating the relationship between pedal force and master clutch pressure.

The above arrangement of the spool and spring that allows for a clutch control spool without a reduced area reaction pin as utilized on the clutch control valve of the previous tractors. Yet the present inventive clutch control valve provides for low pedal efforts within the limited pedal travel. This is done by using the clutch pressure to "help" the operator in actuating the pedal. (A large reaction area on the spool causes larger forces on the spool making it less sensitive to frictional forces. Thus, a more precise clutch control is effected.) The clutch pressure acting on the actuating stem or spool 11 allows a reduced force spring 23. If the clutch pressure were not used, the force of spring 23 would have to be large enough to hold spool 11 to stop 19 against the source 2 pressure times the area of spool 7. As the spool 11 is pulled rightward, the spring force would continue to increase causing a high pedal effort. With the use of the clutch pressure, the spring force, plus the pressure force equals the force on spool 7. Now, as the spool 11 is moved rightward, the pressure force drops as the spring force rises to provide a much reduced net pedal effort. FIG. 2 illustrates the pedal force versus travel force relationship of a prior master clutch control valve and the master clutch control valve of the present invention.

The clutch control valve provides for a high initial pedal effort with a low pedal effort in the "inching" control range. This will eliminate the tendency for the clutch to be partially engaged when the operator rests his foot on the clutch pedal. It will also tend to be less sensitive to binding linkage due to dirt and rust which may not allow the pedal to return to the fully engaged position. Of course clutch failure can be the result if the clutch is not allowed to fully engage.

Again, using the clutch pressure to act on the actuating stem 11 provides a high force when the clutch pressure is high and reduced force when it is low.

The arrangement of check valve 45 and fluid resistor 47 provides for a gradual clutch engagement when the pedal is suddenly released by restricting the oil flow to the actuating spool 11 in one direction only. The arrangement of landing 51 on spool 7 drops the High-Low clutch pressure by preventing flow through passage 50 when the clutch pedal is completely depressed.

While a few of the embodiments of the present invention have been explained, there will be readily apparent to those skilled in the art of the various modifications which can be made to the present invention without departing from the spirit and scope of this application as it is accomplished by the following claims.

What is claimed is:

1. A control valve for a fluid activated clutch comprising:

a valve body having a bore with a chamber at one end of said bore;

a fluid inlet intersecting said bore for permitting pressurized fluid to enter said bore;

a fluid outlet intersecting said bore for permitting pressurized fluid to exit said bore;

a first valve spool slidably mounted within said bore and having an internal passage allowing fluid communication between said fluid inlet and said chamber, and a first drain line intersecting said bore to permit fluid communication between said chamber and said drain line;

a second valve spool mounted manually slidably movable within said bore, said second valve spool having an internal passage with a bushing mounted therein, said first valve spool having a pin attached thereto which extends into the internal passage within said second valve spool, said pin having a head which is engageable with said bushing when said second valve spool is moved a predetermined distance for permitting said second valve spool to pull said first valve spool;

means for biasing said second valve spool into engagement with an annular stop surrounding a portion of said first spool, said stop having a plurality of openings therein, and a second drain line intersecting said bore adjacent to said stop;

spring means interposed between said first and second valve spools;

first check valve means mounted within the internal passage of said first valve spool; and a cavity surrounding said second valve spool and second check valve means connected between said cavity and said fluid outlet.

* * * * *